Dec. 4, 1973  R. L. HANSEN  3,776,805
SOLAR CONTROL PRODUCTS
Filed Sept. 7, 1971

INVENTOR
RICHARD L. HANSEN

BY Kinney, Alexander,
Sell, Steldt & DeLaHunt
ATTORNEYS

United States Patent Office 3,776,805
Patented Dec. 4, 1973

3,776,805
SOLAR CONTROL PRODUCTS
Richard L. Hansen, Fridley, Minn., assignor to Minnesota Mining and Manufacturing Company, St. Paul, Minn.
Filed Sept. 7, 1971, Ser. No. 178,253
Int. Cl. B32b 15/08; B44f 1/04; G02b 5/08
U.S. Cl. 161—2                                    7 Claims

ABSTRACT OF THE DISCLOSURE

Transparent-reflective metallized solar control film having a tacky light-curable adhesive is applied to window glazing and the adhesive thereafter cured to a hard state by visible or near-ultraviolet light. When applied to planar thermoplastic polymeric glazing, the interface remains free from bubbles caused by evolution of monomer or other gaseous material from the polymeric glazing material, even when the laminate is thermoformed, e.g., to a concavo-convex dome.

BACKGROUND OF THE INVENTION

The invention relates to solar control products, including solar control films and glazing units made by laminating solar control films to conventional glass or plastic glazing materials.

Antonson and Berger U.S. Pat. No. 3,290,203 discloses a solar control film in which a transparent film is provided with a transparent-reflective aluminum deposit, the aluminum protectively covered by a thin, transparent water-insoluble moisture-transmitting coating, and a water-activatable adhesive applied thereover. The adhesive can be activated with water and the solar control film then laminated to the interior surface of a conventional glass windowpane. If desired, the water-soluble adhesive of Antonson and Berger can be replaced by a normally tacky and pressure-sensitive adhesive, although special handling techniques are needed to apply large sheets of such a film to a windowpane.

Other problems are encountered when the glazing material is a polymeric thermoplastic material such as polymethylmethacrylate or polycarbonate. Both water-soluble adhesives and pressure-sensitive adhesives adhere tenaciously, but the gas consisting of monomer or water vapor which is gradually evolved from thermoplastic polymeric substrates forms unattractive bubbles between the plastic windowpane and the solar control film. At room temperature, such bubbles may develop within one month, but if the plastic glazing-solar control film laminate is subjected to heat (as in thermoforming) bubbles may develop within a few minutes.

When an attempt is made to utilize a heat-curing adhesive, other problems arise. On the one hand, if cure can be effected at a relatively low temperature, the shelf life of the product is so short as to be economically unattractive. On the other hand, if a higher temperature is required to cure the adhesive, evolving gas bubbles cause the same problem encountered with both the water-soluble and pressure-sensitive adhesives.

Prior to the present invention, then, there has not existed any commercially satisfactory way of applying a solar-control film to thermoplastic polymeric glazing materials.

SUMMARY OF THE INVENTION

The present invention provides an improved solar control film of the type wherein a thin, flexible, light-transmissive polymeric film is provided on one face with a transparent-reflective metal deposit, and a thin, uniform layer of adhesive is applied thereover. Unlike prior art solar control films, the present product adheres to thermoplastic polymeric glazing materials, while simultaneously preventing the formation of disfiguring monomer or water vapor bubbles at the interface. The present product differs from those of the prior art in the type of adhesive, which is a viscous substantially clear film-forming light-curable composition coated over the metallized surface in a dry thickness of about 0.1 to 1.0 mil. To facilitate handling, the exposed adhesive surface is mechanically protectively covered, e.g., with a removable release liner (which may be either a separate sheet or the opposite surface of the film backing, treated with a low adhesion coating, if desired, when the solar control film is wound upon itself convolutely in roll form) or a tack-free coating of water-soluble material such as methyl cellulose. In any case, the solar control film is stored under sufficiently subdued lighting as to substantially retard or preclude adhesive cure.

Various polymeric films may be employed as the backing for solar control films embodying the invention. Biaxially oriented polyethylene terephthalate, acrylics and polyvinyl fluoride are highly effective, the latter two proving especially useful when the film surface is exposed to outside weather.

Various metals may be utilized to achieve the desired transparent-reflective effect, including gold, silver, bronze, nickel, aluminum, and the like. Aluminum is widely used in solar control film, but the warmer color imparted by gold and bronze may be preferred in some cases.

In preparing laminated glazing units in accordance with the invention, the light-curable adhesive is made available by removing the protective sheet covering or applying water to the water-soluble protective coating. The adhesive surface of the solar control film is then positioned on the desired glass or plastic glazing material and pressed firmly into uniform contact, after which the adhesive is exposed to light having a wavelength suitable to effect cure, e.g., in the range of 3,000 to 7,000 angstrom units. If the glazing material does not itself transmit light of the proper wavelength, or if the solar control film is applied to unmounted glazing material in a factory, the film surface of the laminate can be exposed to the source of adhesive-curing light. Surprisingly, the reflective metal layer does not prevent the passage of sufficient light to activate the photo-polymerization catalyst. After cure, the adhesive should be clear and stable in the presence of sunlight. If either the metal or the glazing material is deleteriously affected by acids or bases, the pH of the adhesive should be and remain substantially neutral.

When the solar control film of this invention is applied to the surface of a thermoplastic polymeric glazing material such as polymethylacrylate or polycarbonate, no interfacial bubbles result from monomer evolving from the polymeric glazing material. This freedom from bubbles exists both where the adhesive is cured by exposure to sunlight alone and where the adhesive is cured by a combination of light and heat. Thermoforming a cured laminate of solar control film and polymethyl methacrylate does not result in interfacial bubble formation.

Adhesive systems used in the practice of the invention are based on at least three components, viz., 100 parts by weight polyester resin containing from about 1 to 6 millimoles of ethylenic unsaturation per gram*, 30 to 100 parts by weight ethylenically unsaturated monomer, and 2–50 parts by weight catalyst which is a compound or combination of compounds which under the influence of light in the wavelength range of 3,000 angstrom units to 7,000 angstrom units produces free radicals capable of initiating vinyl polymerization. Desirably, up to 100 parts by weight adhesion-promoting polymeric additive ---
*I.e., each gram of resin will react with 1 to 6 gram millimoles of hydrogen.

is also included. If the viscosity of the foregoing components is too high, solvent may be added as needed.

The requisite ethylenic unsaturation may be introduced into the polyester resin during its manufacture by the incorporation of maleic anhydride, fumaric acid, endomethylene tetrahydrophthalic acid, and the like. Alternately, some or all of the unsaturation may be introduced by incorporating unsaturated glycols such as 2,5-dimethyl-3-hexyne-2,5-diol; 3,6-dimethyl - 4 - octyne-3,6-diol; 2-butene-1,4-diol, etc. In any case, the polyester should contain at least about 1 millimole unsaturation per gram. If the polyester resin component consists of a combination of two or more resins, the weighted average of the unsaturation should be at least about 1 millimole per gram of the combination. In addition to the unsaturated components the polyester may contain one or more other acids, anhydrides, and glycols such as isophthalic acid, terephthalic acid, adipic acid, malonic acid, phthalic anhydride, ethylene glycol, propylene glycol, diethylene glycol, dipropylene glycol and the like.

Polyesters which, in the cured state, have high heat distortion temperatures are preferred. In general, the resin should have a heat distortion temperature at least as high as the temperature which will be attained by the laminated product, e.g., in thermoforming.

The unsaturated monomer may be chosen from one or more classes of ethylenically unsaturated compounds including esters of vinyl alcohol such as vinyl acetate, achylic and methacrylic acid esters such as butylacrylate, methylmethacrylate and the like, derivatives of allyl alcohol such as diallylphthalate, styrene, vinyl toluene, divinyl benzene and triallyl cyanurate, etc. The most useful monomers are those with relatively high boiling points, such as diallylphthalate, triallyl cyanurate, lauryl methacrylate, and vinyl toluene.

The catalyst consists of a compound or combination of compounds which under the influence of light and/or heat produces free radicals capable of initiating vinyl polymerization. At least one of the catalysts employed in a combination must be capable of producing free radicals using light alone.

In order to be operable, the photo catalyst must produce free radicals when subjected to light in the wavelength range of 3,000 to 7,000 angstrom units. The acyloins, particularly benzoin and benzoin ethers, are especially preferred but the azo compounds described in U.S. Patent No. 2,471,959, such as alpha, alpha'-azobisisobutyro-nitrile, and diazonium salts described in U.S. Patent No. 2,996,381, especially when sensitized as described in U.S. Patent No. 3,099,558 are useful. In addition, derivatives of benzophenone such as 2,2'-dihydroxy-4,4'-dimethoxy benzophenone, and 2,4-dihydroxy benzophenone may be used. Certain halogenated compounds such as iodoform produce free radicals at long enough wavelengths to be operable.

In combination with a photocatalyst, a thermal catalyst such as tert-butyl peroctoate can be used to reduce the length of the photocure period or ensure adhesive cure when the light intensity is low.

Adhesion-promoting additives include polyacrylates or polymethacrylates such as polymethylmethacrylate, polyvinyl formal resin, polyvinyl butyral resin, phenoxy resin, or polyaryl sulfone resin. Thermosetting hydroxyl-functional acrylic resins which may be cross-linked are especially useful.

BRIEF DESCRIPTION OF THE DRAWING

Understanding of the invention will be facilitated by reference to the accompanying drawings, in which like numbers refer to like parts in the several views and in which.

DESCRIPTION OF PRESENTLY PREFERRED EMBODIMENTS

Figure 1:
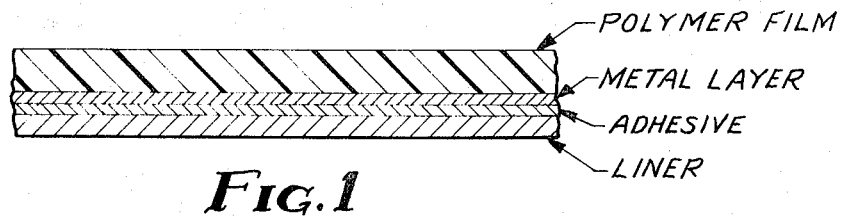
FIG. 1 is a cross sectional view of a solar control film made in accordance with the invention.
Figure 2:
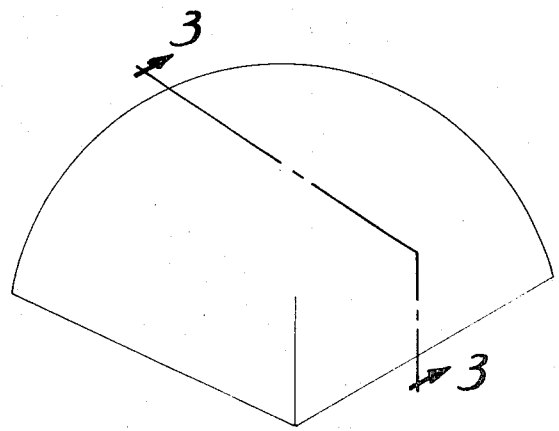
FIG. 2 is a view in perspective of a dome-shaped laminated solar control structure made in accordance with the invention.
Figure 3:
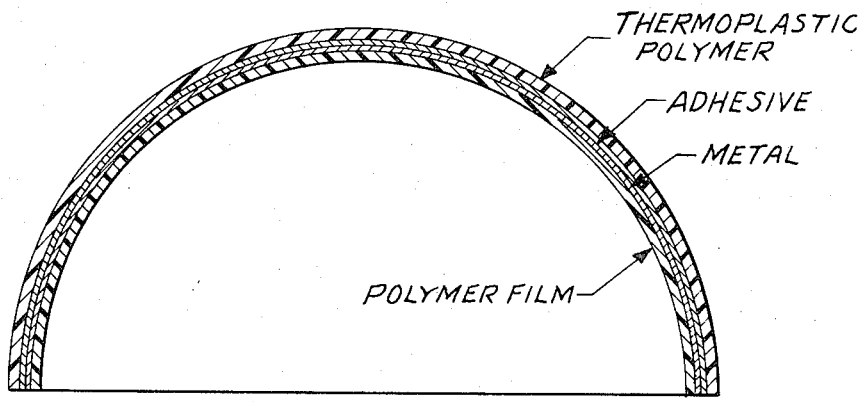
FIG. 3 is a cross sectional view of the structure of FIG. 2, taken along section line 3—3.

Understanding of the invention will be further enhanced by reference to the following illustrative but non-limiting examples, in which all parts are by weight unless otherwise noted.

EXAMPLE 1

A 1-mil film of biaxially oriented polyethylene terephthalate is vapor-coated with aluminum to reduce its visible light transmission to about 20%. The metallized surface is roll-coated with a solution containing the following components:

| Component: | Parts |
|---|---|
| Saturated polyester, molecular weight 20,000–30,000, acid number 2.08, intrinsic viscosity 0.74 ("PE-222," available from Goodyear Tire and Rubber Company) | 18.50 |
| 2,2'-dihydroxy-4-methoxy-benzophenone | 0.12 |
| Toluene | 81.38 |

After drying at 180° F. (about 82° C.) to evaporate the solvent, a protective coating weighing about 5.3 gms./m.² remains. An adhesive is then roller-coated on top of the protective layer at various dry coating weights in the range of 3 to 20 gms./m.² (0.1–1.0 mil thickness), optical properties generally improving as the thickness of the adhesive layer is decreased. The adhesive has the following composition:

| Component: | Parts |
|---|---|
| Unsaturated polyester of maleic anhydride isophthalic acid, and propylene glycol in 1:1.75:2.97 mole ratio, having an acid number of 27, molecular weight of 1760 and an unsaturation value of 1.38 millimoles/gm. ("CoRezyn 2," available from Interplastic Corporation) | 20.4 |
| Unsaturated polyester of maleic anhydride, o-phthalic acid adipic acid and diethylene glycol, having an acid number of 26, molecular weight of 2030, and unsaturation value of 1.1 millimoles/gm. ("CoRezyn 3," available from Interplastic Corporation) | 8.2 |
| Solid phenoxy resin having a molecular weight of about 30,000 ("Phenoxy PKHH," available from Union Carbide) | 1.8 |
| Diallylphthalate | 7.0 |
| Benzoin | 0.7 |
| Acetone | 37.2 |
| Toluene | 24.7 |

After drying at 200° F. (about 93° C.), the tacky adhesive is protected by lamination to a release liner. Various liners consisting of silicone-treated paper and polypropylene film as well as urethane-treated polyester film are utilized.

The liner is removed from several sheets of this material, which are applied by dry lamination to plate glass sheets, as well as to rigid transparent acrylic and polycarbonate plastic sheets. The adhesive is cured by directing the light from a 275-watt sunlamp through either the glazing or through the aluminized film in the case of polycarbonate (which transmits near UV light poorly). Depending upon the glazing material, temperature and distance between the lamp and the plastic surface, the samples are cured in from 15 minutes to 16 hours. After the adhesive is cured, the solar control film is strongly bonded to the glazing, as evidenced by little or no removal when the film is crosshatched with a razor blade and pressure-sensitive adhesive tape is firmly rubbed down thereover and rapidly stripped away. When samples of the plastics containing the cured solar control film are heated to 150–200° F. (about 65–93° C.) for periods ranging to several days, there is no evidence of bubbling.

Laminates of acrylic sheet and cured film in accordance with this example, having an adhesive coating of 10 gms./m.² (about 0.4 mil thick) were heated to 350° F. (about 175° C.) in about four minutes by directing radiant energy on the acrylic surface and then blown into hemispheroidal domes with the solar control film on either the concave or the convex side. During this process the film remained tightly adhered to the acrylic sheet, stretching as required, and no interfacial bubbles appeared.

To facilitate installation, the liner is removed from other sheets of this material, and the adhesive moistened with either a soap solution or dilute aqueous ammonia containing a detergent. The sheets are then laminated to glass and plastic glazing (which has first been similarly moistened) and a squeegee used to remove excess liquid. Upon drying and curing, the solar control film was found to be bonded extremely well to the glazing material.

EXAMPLE 2

The metallized protectively coated polyester film of Example 1 was knife coated on the protective layer, at a dry coating weight of 12.9 gms./m.², with the following adhesive:

| Component: | Parts |
| --- | --- |
| Unsaturated monomer-free polyester of fumaric acid, maleic anhydride, ethylene glycol and dipropylene glycol, in a 4:1:3.75:1.25 mole ratio, having an acid number of 35, a heat distortion point of 215° C., and a number average molecular weight of 1625, a saponification number of 88 gms./gm. equivalent, and an unsaturation of 5.5 millimoles/gm. ("Stypol" 40–2025, available from Freeman Chemical Corporation) | 45.5 |
| Polyvinyl formal resin having a weight average molecular weight of 34,000, a hydroxyl content (expressed as percent polyvinyl alcohol) of 5–6, an acetate content of 9.5–13 (expressed as percent polyvinyl acetate), and a viscosity of 40–60 cps. as determined with 5 gm. resin made to 100 ml. with ethylene chloride at 20° C. ("Formvar 15/95E," available from Shawinigan Resins Corporation) | 1.9 |
| Diallylphthalate | 19.5 |
| Benzoin methyl ether | 1.3 |
| Methylene chloride | 31.8 |
| Ethylene dichloride | 120 |

After air drying, the film was laminated to a release liner which was subsequently removed. The film was applied to acrylic sheet using water containing a small amount of ammoniated detergent ("Parson's Sudsy Detergent Ammonia") as lubricant to facilitate positioning, a squeegee being used to remove excess water. The resultant laminate, which was of good optical quality, was mounted on the inside of a normal glass-glazed window, the film toward the interior, and sunlight was allowed to strike the acrylic sheet. Within 18 days the adhesive was cured, even on a north exposure, and the film did not separate from the plastic when tested in the manner described in Example 1. Subsequent exposure of the sheet for 20 hours at 200° F. (about 90° C.) did not produce bubbling. When an aqueous soap solution is used as the lubricant, adequate adhesion is obtained, but the solar control film can be cleanly removed, leaving no residue and causing no damage to the acrylic surface.

The same film was dry laminated to acrylic sheet, cured under a sunlamp and heated to 350° F. (about 175° C.) over a 5-minute period in an oven without bubbling. The same film was dry laminated to polycarbonate sheet, cured through the aluminized film and heated for 16 hours at 200° F. (about 93° C.) without bubbling. The adhesion was adequate but the solar control could be cleanly removed, leaving no residue and causing no damage to the polycarbonate surface.

EXAMPLE 3

An aluminized polyester film, without the protective layer described in Example 1, was knife-coated with the following adhesive at a dry coating weight of about 10.7 gms./m.².

| Component: | Parts |
| --- | --- |
| Unsaturated polyester of phthalic acid, fumaric acid and propylene glycol in a 1:1.3:2.3 mol ratio, having an acid number of 19, heat distortion temperature of 120° C., number average molecular weight of 1250, saponification number of 98.6 gms./gm. equivalent and an unsaturation of 2.84 millimoles/gm. ("CoRezyn 6," available from Interplastic Corporation) | 15 |
| Solution of polymethyl methacrylate at 30% solids in a 90/10 mixture of toluene/butanol ("Acryloid A–21," available from Rohm & Haas Corporation) | 17 |
| Diallylphthalate | 5 |
| Benzoin butyl ether | 4 |
| Toluene | 34 |

After air drying, the slightly tacky film was laminated to a release liner from which it could be separated readily. Using water as a lubricant, samples of film were applied to acrylic sheet which was then mounted on the inside of a west-facing window, the film toward the interior. Within 18 days the adhesive was cured, the film was adhered well to the plastic and 20 hours exposure at 200° F. (about 93° C.) did not cause bubbles to appear. Samples prepared by dry lamination of the film to the sheet performed in the same way.

EXAMPLE 4

The following adhesive was knife-coated on the metallized protectively coated polyester film of Example 1 at a dry coating weight of about 10.7 gms./m.².

| Component: | Parts |
| --- | --- |
| Unsaturated polyester of Example 3 | 15 |
| Thermosetting hydroxyl—functional acrylic resin within a nitrogen crosslinking resin at 50% solids in a solvent consisting of 60/22/18 xylene/butanol/ethylene glycol monoethyl ether ("Acryloid AT–50," available from Rohm & Haas Corporation) | 10 |
| Diallylphthalate | 5 |
| Benzoin butyl ether | 4 |
| Toluene | 41 |

After air drying, the film was laminated to acrylic sheet and cured under a sunlamp. The cured film exhibited excellent adhesion to the plastic and did not bubble after several hours at 200° F. (about 93° C.).

EXAMPLE 5

The following adhesive was knife-coated on the aluminized and protectively coated film of Example 1 at a dry coating weight of about 10.7 gms./m.².

| Component: | Parts |
| --- | --- |
| Unsaturated polyester of Example 3 | 40 |
| Diallylphthalate | 14 |
| Benzoin methylether | 8 |
| Toluene | 88 |

After air drying, the film was laminated to acrylic sheet and cured under a sunlamp. The sheet did not bubble on exposure for 20 hours at 200° F. (about 93° C.). Whereas adhesion of the film to the plastic was adequate for many purposes, the film could be stripped intact from the plastic without leaving any residue.

EXAMPLE 6

The following adhesive was knife-coated on the aluminized and protectively coated film of Example 1 at a dry coating weight of about 10.7 gms./m.$^2$.

| Component: | Parts |
|---|---|
| Unsaturated polyester of Example 3 | 15 |
| Butylacrylate monomer | 5 |
| Diallylphthalate | 5 |
| Benzoin butylether | 4 |
| Isopropanol | 2 |
| Toluene | 46 |

After air drying, the film was laminated to acrylic sheet and cured under a sunlamp. Whereas the sheet did not bubble on exposure to 200° F. (about 93° C.), the film could be stripped from the plastic without leaving any residue.

EXAMPLE 7

The following adhesive was knife-coated on the aluminized and protectively coated film of Example 1 at a dry coating weight of about 10.7 gm./m.$^2$.

| Component: | Parts |
|---|---|
| Unsaturated polyester of Example 3 | 7.5 |
| Polymethyl methacrylate solution of Example 3 | 8.5 |
| Diallylphthalate | 5 |
| Benzoin butyl ether | 2 |
| tert-butylperoctoate | 0.07 |
| Toluene | 17 |

After air drying, the film was applied, using water as a lubricant, to acrylic sheet, after which the laminate was mounted on the inside of a west-facing window, film toward the interior. Half the plastic sheet was covered by a paper sheet on the side opposite the film to prevent direct sunlight from impinging on the adhesive. Within a month the adhesive was cured throughout the laminate, the film was well adhered, and bubbles did not develop on exposure to 200° F. (about 93° C.).

EXAMPLE 8

The following adhesive was knife-coated on the protected, aluminized film of Example 1 at a dry coating weight of about 12.9 gms./m.$^2$.

| Component: | Parts |
|---|---|
| Unsaturated polyester of Example 2 | 4.55 |
| Polyvinyl formal resin of Example 2 | 0.19 |
| Diallylphthalate | 1.95 |
| Benzoin methyl ether | 0.13 |
| tert-butylperoctoate | 0.05 |
| Methylene chloride | 3.18 |
| Ethylene dichloride | 11.95 |

After air drying, the film was laminated to acrylic sheet. The adhesive was partially cured by exposing the sheet at 150° F. (about 65° C.) for 2 minutes to the radiation from a sunlamp placed about 10 cm. away from the laminate, on the acrylic side. The sheet was then heated to 350° F. in an oven, completing the cure without bubbling.

What is claimed is:

1. A rigid, heat-reflective, light-transmissive laminated glazing unit comprising in combination:
    a rigid, light-transmissive thermoplastic synthetic polymeric glazing material
    a flexible sheet material comprising a thin, flexible, light-transmissive polymeric film having on the side adjacent said glazing material a transparent reflective metal deposit and
    uniformly bonding said sheet material to said glazing material throughout their coextensive surfaces so that there are no visually detectable bubbles therebetween, a 0.1 to 1.0-mil cured layer of substantially clear film-forming sunlight-stable synthetic resinous adhesive containing a free radical photo initiator,
    at least one of said glazing material and said sheet material being capable of transmitting both visible light and near ultraviolet light.

2. The glazing unit of claim 1 wherein the synthetic polymeric glazing material is selected from the class consisting of polymethyl methacrylate and polycarbonate.

3. The glazing unit of claim 2 wherein the glazing material has a concavo-convex shape.

4. A thin, flexible tacky transparent reflective sheet material particularly adapted for use in forming the glazing unit of claim 1, comprising in combination:
    an optically clear flexible thermoplastic polymeric film backing having on one surface a transparent-reflective metallic layer,
    uniformly adhered over said metallic layer a tacky, viscous adhesive coating about 0.1 to 1.0 mil thick and consisting essentially of an actinically curable polyester having an unsaturation value of 1 to 6 millimoles per gram, unsaturated monomer, and an effective amount of a free radical photo catalyst capable of initiating vinyl polymerization, said coating being transparent and sunlight-stable when cured, and
    a protective covering over said tacky coating.

5. The sheet material of claim 4 wherein the adhesive consists essentially of 100 parts by weight polyester, 30 to 100 parts by weight unsaturated monomer 2 to 50 parts by weight photo catalyst, and up to 100 parts by weight adhesion promoting additive.

6. The sheet material of claim 5 wherein
    (1) the polyester is formed from fumaric acid, maleic anhydride, ethylene glycol and dipropylene glycol,
    (2) the unsaturated monomer is diallylphthalate,
    (3) the photo catalyst is benzoin butyl ether and
    (4) the adhesion promoting additive is polyvinyl formal.

7. The sheet material of claim 5 wherein the adhesion promoting additive is selected from the class of polymers consisting of polyacrylates, polymethacrylates, polyvinyl formal, polyvinyl butyral, phenoxy resin and polyaryl sulfone resin.

References Cited
UNITED STATES PATENTS

| | | | |
|---|---|---|---|
| 3,681,179 | 8/1972 | Theissen | 161—4 |
| 3,290,203 | 12/1966 | Antonson et al. | 161—4 |
| 3,677,920 | 7/1972 | Kai et al. | 161—194 X |
| 2,894,932 | 7/1959 | Bader et al. | 161—195 X |
| 3,619,335 | 11/1971 | Bryan | 161—1 |
| 3,607,584 | 9/1971 | Becht | 161—4 |
| 3,359,153 | 12/1967 | Bean | 161—410 X |
| 3,661,686 | 5/1972 | Armstrong | 161—2 |
| 3,582,398 | 6/1971 | Ringler | 161—183 X |
| 3,714,007 | 1/1973 | Borrel et al. | 161—195 X |

HAROLD ANSHER, Primary Examiner

U.S. Cl. X.R.

161—4, 183, 214, 408, 409, 410